(12) United States Patent
Nakata et al.

(10) Patent No.: US 12,529,188 B2
(45) Date of Patent: Jan. 20, 2026

(54) SHEET MANUFACTURING APPARATUS

(71) Applicant: SEIKO EPSON CORPORATION, Tokyo (JP)

(72) Inventors: Hirofumi Nakata, Nagano (JP); Keigo Yamasaki, Nagano (JP); Yuka Kato, Nagano (JP); Hirokazu Yamaga, Nagano (JP); Shigeo Fujita, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 258 days.

(21) Appl. No.: 18/322,627

(22) Filed: May 24, 2023

(65) Prior Publication Data

US 2023/0383462 A1 Nov. 30, 2023

(30) Foreign Application Priority Data

May 26, 2022 (JP) .................. 2022-085850

(51) Int. Cl.
*D21F 1/06* (2006.01)
*D21G 9/00* (2006.01)

(52) U.S. Cl.
CPC ............. *D21F 1/06* (2013.01); *D21G 9/0027* (2013.01)

(58) Field of Classification Search
CPC .................. D21F 1/06; D21G 9/0027
See application file for complete search history.

(56) References Cited

U.S. PATENT DOCUMENTS

| | | | |
|---|---|---|---|
| 4,099,296 A | | 7/1978 | Gustavsson |
| 5,888,352 A | * | 3/1999 | Yoshikawa ............ D21H 13/40 |
| | | | 162/336 |
| 6,238,518 B1 | * | 5/2001 | Rokman ................ D21F 9/003 |
| | | | 162/190 |
| 11,148,147 B2 | * | 10/2021 | Young .................. B02C 13/284 |
| 11,306,439 B2 | | 4/2022 | Higuchi |
| 11,686,044 B2 | | 6/2023 | Matsuda et al. |
| 2019/0218714 A1 | * | 7/2019 | Oguchi ............... D21G 9/0027 |
| 2022/0064856 A1 | | 3/2022 | Matsuda et al. |

FOREIGN PATENT DOCUMENTS

| | | |
|---|---|---|
| CN | 114102791 A | 3/2022 |
| JP | 2003268665 A * | 9/2003 |
| JP | 2020-084395 A | 6/2020 |

* cited by examiner

*Primary Examiner* — Abbas Rashid
*Assistant Examiner* — Stephen M Russell
(74) *Attorney, Agent, or Firm* — Global IP Counselors, LLP

(57) ABSTRACT

A sheet manufacturing apparatus includes a pipe that supplies a material containing fibers, a collision section with which the material moving from the pipe collides, and an accumulation section that is disposed downstream of the collision section and accumulates the material to form a web.

7 Claims, 9 Drawing Sheets

| MAGNIFICATION OF CROSS-SECTIONAL AREA OF REDUCER SECTION WITH RESPECT TO CROSS-SECTIONAL AREA OF SUPPLY SECTION | UNIFORMITY EVALUATION RESULT OF SHEET |
|---|---|
| 1.0 | B |
| 2.0 | C |
| 5.0 | B |

SHEET MANUFACTURING APPARATUS

The present application is based on, and claims priority from JP Application Serial Number 2022-085850, filed May 26, 2022, the disclosure of which is hereby incorporated by reference herein in its entirety.

BACKGROUND

1. Technical Field

The present disclosure relates to a sheet manufacturing apparatus.

2. Related Art

In the related art, a sheet manufacturing apparatus that manufactures a sheet from a web on which fibers are accumulated has been known. For example, JP-A-2020-84395 discloses a fiber material accumulation apparatus that unravels material, such as fibers, by rotation of a rotating body and then accumulates the unraveled material.

However, in the apparatus disclosed in JP-A-2020-84395, there is a problem that it is difficult to reduce a variation in a thickness of the web. Specifically, when a direction along a rotation axis of the rotating body of a dispersion section is defined as a width direction of the rotating body, the material is supplied from above the center in the width direction of the rotating body. Therefore, when the web having a wide width direction is formed, the variation in the thickness tends to occur in the width direction. When the variation in the thickness of the web is remarkable, there is a possibility that a thickness of a sheet to be manufactured is uneven and it is difficult to improve a quality. That is, there has been a demand for a sheet manufacturing apparatus that reduces the variation in the thickness of the web.

SUMMARY

According to an aspect of the present disclosure, a sheet manufacturing apparatus includes a supply section that supplies a material containing fibers, a collision section with which the material moving from the supply section collides, and an accumulation section that is disposed downstream of the collision section and accumulates the material to form a web.

BRIEF DESCRIPTION OF THE DRAWINGS

FIG. 2 is a perspective view showing configurations of a supply member, a forming section, and the like.

DESCRIPTION OF EXEMPLARY EMBODIMENTS

In an embodiment which will be described below, a sheet manufacturing apparatus that manufactures a sheet from a web formed by a dry process will be described as an example, and the description will be made with reference to the drawings. In each of the following drawings, XYZ axes, which are coordinate axes orthogonal to each other, are attached as necessary, and a direction indicated by an arrow is defined as a + direction, and a direction opposite to the + direction is defined as a − direction. A −Z direction coincides with a vertical direction. A +Z direction may be referred to as an upward direction, and the −Z direction may be referred to as a downward direction.

In the sheet manufacturing apparatus, the web, or the like, a direction along a Y axis is a width direction, and a direction along a Z axis is a thickness direction. In addition, in the sheet manufacturing apparatus, a destination of a transport direction of a raw material, the web, or the like may be referred to as downstream, and a side that goes back in the transport direction may be referred to as upstream. For convenience of illustration, a size of each member is different from an actual size.

1. Sheet Manufacturing Apparatus

Figure 1:
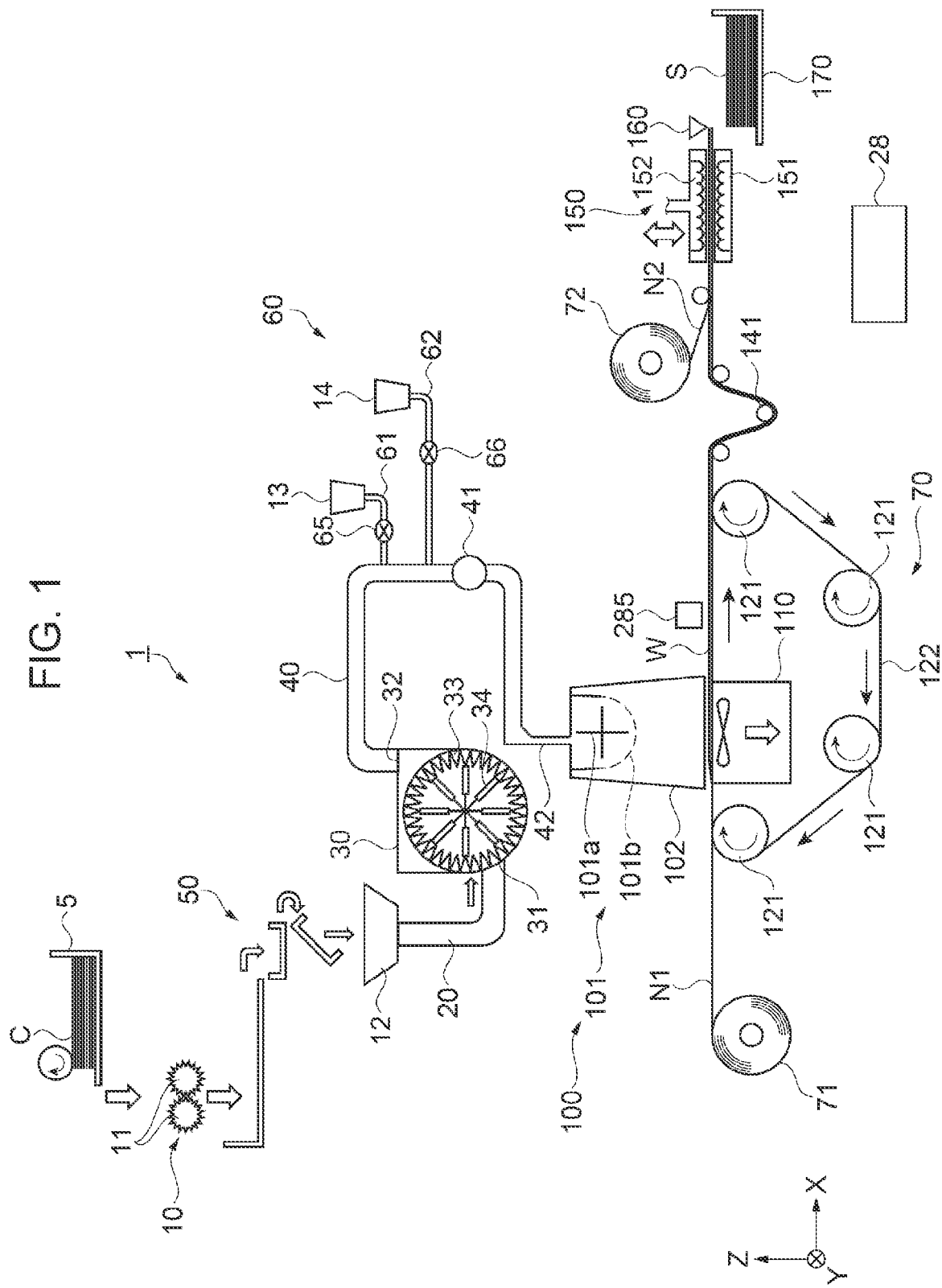
FIG. 1 is a schematic diagram showing a configuration of a sheet manufacturing apparatus according to an embodiment.

As shown in FIG. 1, a sheet manufacturing apparatus 1 according to the present embodiment includes, from an upstream part toward a downstream part, a material supply section 5, a crushing section 10, a defibration section 30, a pipe 40, which is a supply section, a supply member 42, a forming section 100, a web transport section 70, a molding section 150, and a cutting section 160.

In addition, the sheet manufacturing apparatus 1 includes a control section 28 that integrally controls the operation of each of the configurations. The sheet manufacturing apparatus 1 manufactures a sheet S that is a molded product having a sheet shape. A thickness of the sheet S is not particularly limited, and may be a thickness larger than a thickness of copy paper by several cm or more. In the present specification, the thickness is a distance in a direction along the Z axis.

The material supply section 5 supplies a raw material C to the crushing section 10. The material supply section 5 includes an automatic feeding mechanism, and the raw material C is continuously and automatically charged into the crushing section 10. The raw material C is a material containing fibers. Examples of the material containing fibers include paper, corrugated board, pulp, pulp sheet, sawdust, shavings, wood, and fabric.

By defibrating such a raw material C by the defibration section 30, which will be described below, cellulose fibers are obtained as a defibrated material. The cellulose fibers are fibers contained in plant fibers such as wood and are carbohydrates. The cellulose fiber is one of the main components of the sheet S manufactured by the sheet manufacturing apparatus 1. The fibers applied to the sheet S may include synthetic fibers, such as polypropylene, polyester, and polyurethane, in addition to the cellulose fibers. From the viewpoint of reducing the environmental load, it is preferable to use fibers derived from natural products, such as the cellulose fibers.

The crushing section 10 shreds the raw material C supplied from the material supply section 5 in the air, such as the atmosphere. The crushing section 10 has a crushing blade 11. The crushing section 10 is, for example, a shredder or a cutter mill. The raw material C is shredded by the crushing blade 11 into fragments. A planar shape of the fragment is, for example, several mm square or irregular. The fragments are collected in a fixed-quantity material supply section 50.

The fixed-quantity material supply section 50 weighs the fragments and supplies the fragments to a hopper 12 in a fixed quantity. The fixed-quantity material supply section 50 is, for example, a vibration feeder. The fragments supplied to the hopper 12 are transported to an introduction port 31 of the defibration section 30 through the pipe 20.

The defibration section 30 includes an introduction port 31, a discharge port 32, a stator 33, and a rotor 34. The defibration section 30 defibrates the fragments of the raw material C by a dry method to produce the fibers. The fragments of the raw material C are introduced into an inside of the defibration section 30 through the introduction port 31 by a suction airflow of an air blowing section 41, which will be described below. In the present specification, the dry method means that it is carried out in the air, such as the atmosphere, not in the liquid.

The stator 33 and the rotor 34 are disposed inside the defibration section 30. The stator 33 has an inner side surface having a substantially cylindrical shape. The rotor 34 rotates along the inner side surface of the stator 33. The fragments of the raw material C are interposed between the stator 33 and the rotor 34, and are defibrated by a shearing force generated between the stator 33 and the rotor 34 to be the fibers. The fibers are sucked into the pipe 40 from the discharge port 32 of the defibration section 30 by the suction airflow.

It is preferable that the fibers produced by the defibration have a fiber length of 1.0 mm or more. Accordingly, since the fibers are not excessively shortened, a mechanical strength of the sheet S is improved. The fiber length is obtained by a method conforming to ISO 16065-2: 2007.

The pipe 40 communicates with the inside of the defibration section 30 and an inside of the supply member 42. The pipe 40 is provided with a mixing section 60 and the air blowing section 41. The mixing section 60 is disposed upstream of the air blowing section 41. The pipe 40 supplies a mixture, which is a material containing the fibers and will be described below, to the supply member 42 by a downstream airflow generated by the air blowing section 41.

The mixing section 60 includes hoppers 13 and 14, supply pipes 61 and 62, and valves 65 and 66. The mixing section 60 mixes a binder and an additive with the material, such as the fibers, transported in the air of the pipe 40. As a result, the mixture is produced.

The hopper 13 supplies the binder into the pipe 40. The hopper 13 communicates with an inside of the pipe 40 through the supply pipe 61. The valve 65 is disposed between the hopper 13 and the pipe 40 in the supply pipe 61. The valve 65 adjusts the weight of the binder supplied from the hopper 13 to the pipe 40. The valve 65 adjusts a mixing ratio between the fibers and the binder. The binder may be supplied as a powder, or may be melted and supplied.

The binder binds the fibers together. As the binder, a resin having thermal plasticity or thermosetting property is used. Examples of the resin include resins derived from natural products, such as shellac, pine resin, dammar, polylactic acid, polybutylene succinate derived from a plant, polyethylene derived from a plant, and PHBH (registered trademark) (poly(3-hydroxybutyrate-co-3-hydroxyhexanoate)) manufactured by KANEKA CORPORATION, and known synthetic resins. As the binder, one of these types may be used alone, or in combination of two or more types. From the viewpoint of reducing the environmental load, it is preferable that the binder is a resin derived from natural products.

The hopper 14 supplies the additive into the pipe 40. The hopper 14 communicates with the inside of the pipe through the supply pipe 62. The valve 66 is disposed between the hopper 14 and the pipe 40 in the supply pipe 62. The valve 66 adjusts the weight of the additive supplied from the hopper 14 to the pipe 40. The valve 66 adjusts a mixing ratio of the additive to the fibers and the binder.

Examples of the additive include a colorant, a flame retardant, an antioxidant, an ultraviolet absorber, an aggregation inhibitor, an antibacterial agent, an antifungal agent, a wax, and a mold release agent. The additive is not an essential component in the sheet S, and the hopper 14, the supply pipe 62, or the like may be omitted. In addition, the additive may be mixed with the binder in advance and supplied from the hopper 13.

The air blowing section 41 is an airflow generator, such as a blower. The air blowing section 41 supplies the material containing the fibers to the pipe 40 by the downstream airflow. In addition to the airflow, the air blowing section 41 also generates the suction airflow for sucking the fibers from the defibration section 30. A volumetric flow rate of the airflow going downstream of the air blowing section 41 is controlled by the control section 28. The volumetric flow rate can be changed, for example, by a rotation speed of an air blowing fan provided in the air blowing section 41. The control of the air blowing section 41 by the control section 28 will be described below.

The fibers, the binder, and the like are mixed while being transported to the supply member 42 in the pipe to form the mixture. The mixture is introduced into the supply member 42 that couples a downstream end of the pipe to the forming section 100.

The supply member 42 rectifies a flow of the mixture supplied from the pipe 40 and guides the mixture to the forming section 100. The supply member 42 is coupled to a dispersion section 101 of the forming section 100. The detailed configuration and function of the supply member 42 will be described below. The mixture flows into an inside of the dispersion section 101 from the supply member 42.

The forming section 100 produces a web W by accumulating the mixture containing the fibers, the binder, and the like in the air. The web W has a wide band shape in the direction along the Y axis. The forming section 100 includes the dispersion section 101 and an accumulation section 102. The dispersion section 101 is disposed inside the accumulation section 102. The inside of the dispersion section 101 communicates with the pipe 40 through the supply member 42. The web transport section 70 is disposed below the accumulation section 102.

The dispersion section 101 includes a rotating member 101a and a drum section 101b for accommodating the rotating member 101a. The forming section 100 takes the mixture from the supply member 42 into the inside of the dispersion section 101, and accumulates the mixture on a mesh belt 122 of the web transport section 70 by a dry method.

Figure 2:
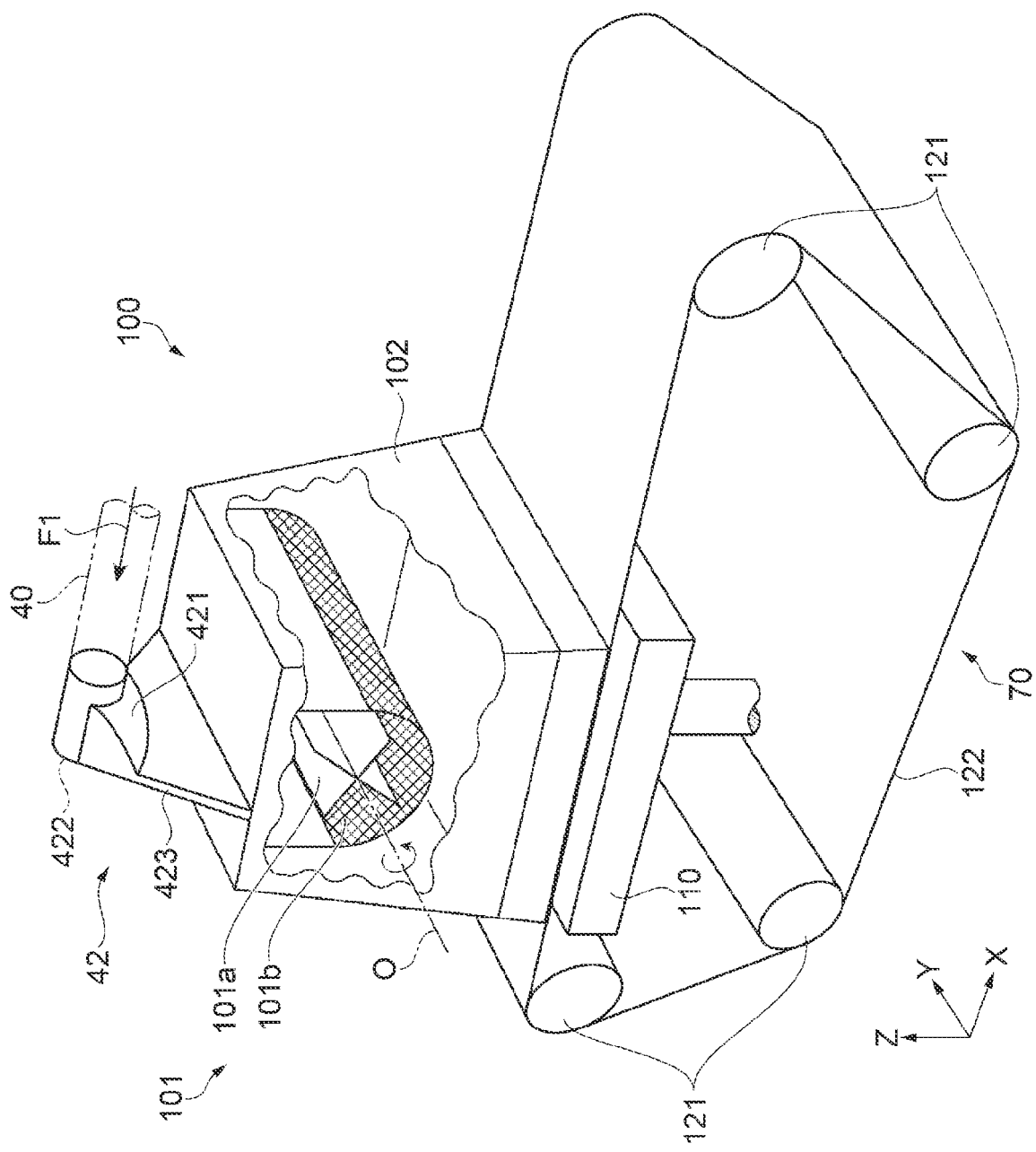
Figure 3:
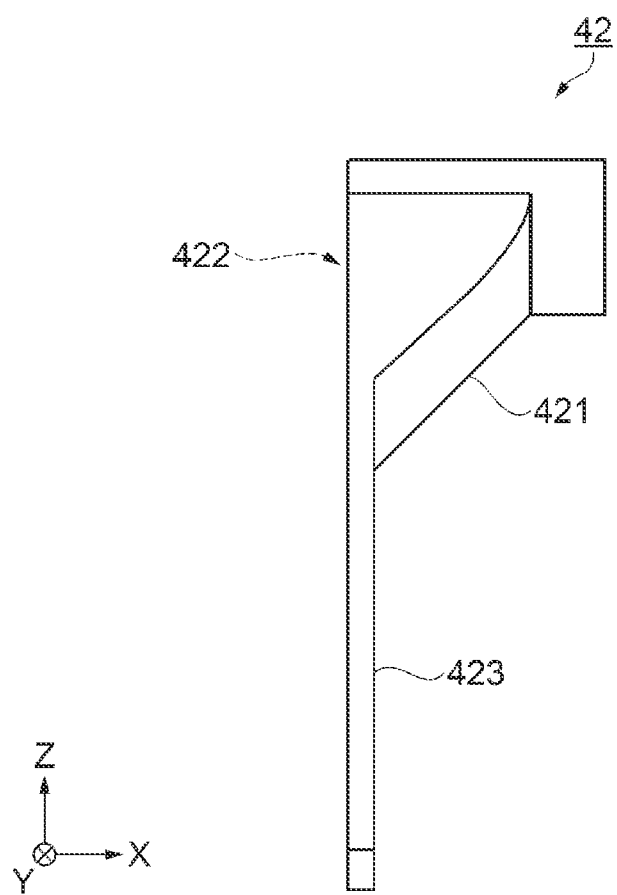
FIG. 3 is a side view showing an appearance of the supply member.

As shown in FIG. 2 and FIG. 3, the supply member 42 is a member having a substantially triangular shape in a side view from a +X direction. The supply member 42 includes a reducer section 421, a collision section 422, and a duct section 423. The mixture supplied from the pipe 40 flows into the supply member 42 by a flow F1. A traveling direction of the flow F1 is a substantially –X direction.

In the supply member 42, the reducer section 421, the collision section 422, and the duct section 423 are disposed in the above-described order from the upstream part toward the downstream part. That is, the reducer section 421 is disposed between the pipe 40 and the collision section 422. The duct section 423 is disposed between the collision section 422 and the accumulation section 102 of the forming section 100.

The reducer section 421 is coupled to an end portion of the pipe 40 in the –X direction. A cross-sectional area of the reducer section 421 along a YZ plane is gradually increased toward the –X direction, which is the direction in which the flow F1 travels.

The collision section 422 is disposed along the YZ plane. A planar shape of the collision section 422 as viewed from the +X direction is a substantially fan shape. The mixture that is moved from the pipe 40 by the flow F1 collides with the collision section 422. The mixture collides with the collision section 422, and the traveling direction is changed substantially downward.

The duct section 423 is provided below the collision section 422. The duct section 423 has a shape that is gradually widened downward in a side view from the +X direction. That is, in the direction along the Y axis, a width of the duct section 423 is wider than a width of a space formed by the reducer section 421 and the collision section 422. In addition, in the direction along the X axis, the width of the duct section 423 is narrower than the width of the space. Therefore, the mixture that is moved to the forming section 100 via the duct section 423 passes through a space in which the width in the direction along the X axis is narrower and the width in the direction along the Y axis is wider.

Figure 4:
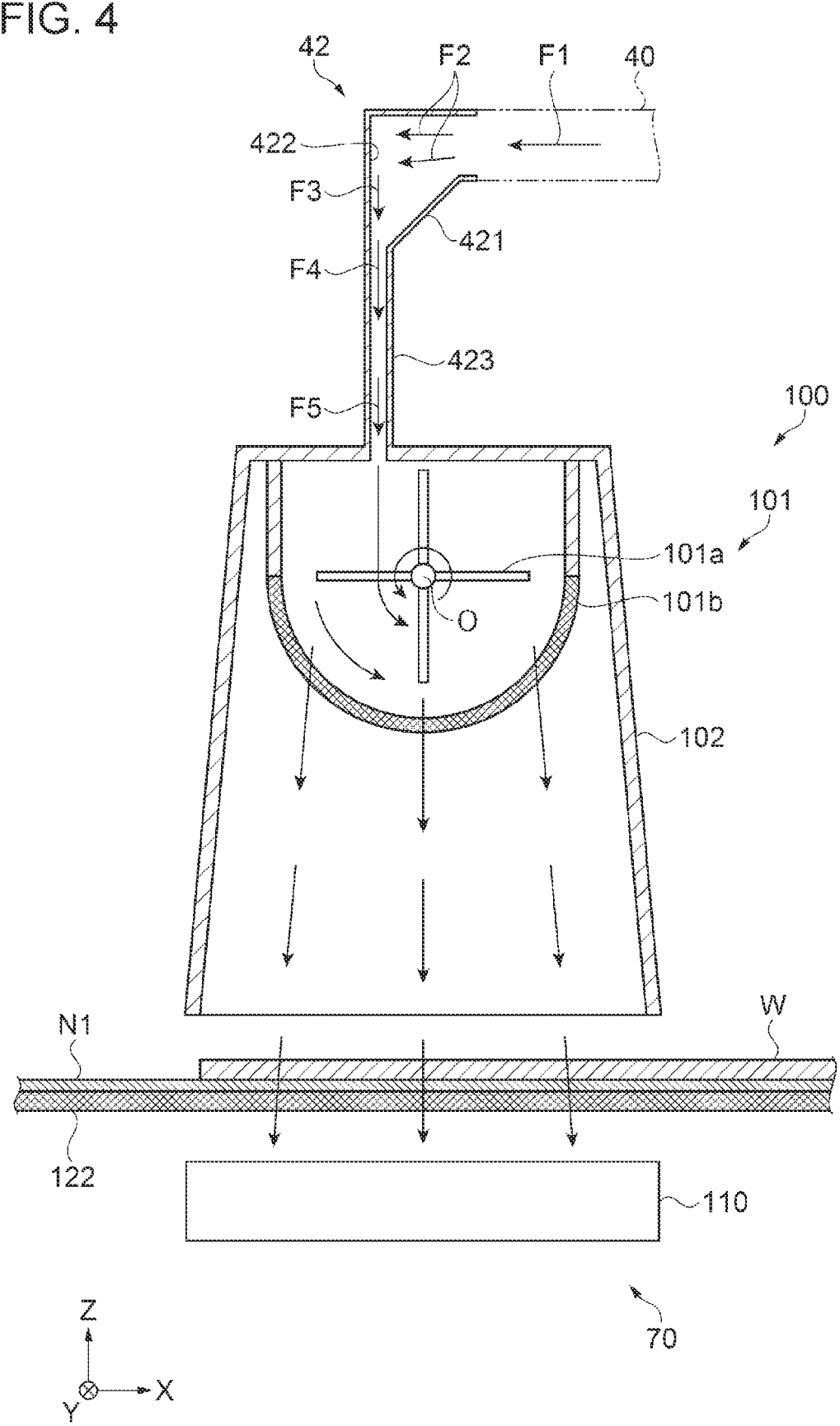
FIG. 4 is a schematic cross-sectional view showing actions of the supply member and the forming section.

As shown in FIG. 4, the flow F1 of the mixture that flows into the supply member 42 from the pipe 40 is decreased in speed in the reducer section 421 to become a flow F2. Due to the collision with the collision section 422, the flow F2 is further decreased in speed to become a substantially downward flow F3. The flow F3 travels from the space formed by the reducer section 421 and the collision section 422 to the duct section 423 to be increased in speed to become a flow F4.

Figure 5:
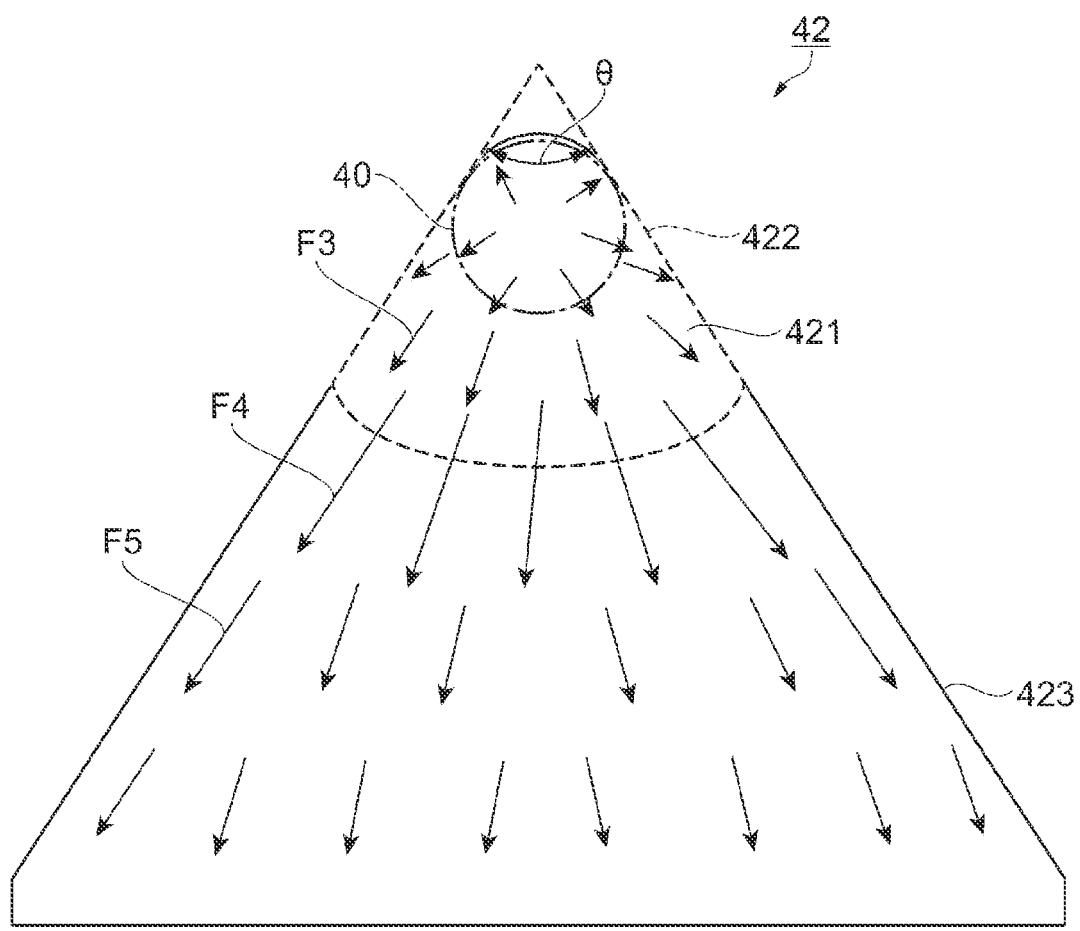
FIG. 5 is a schematic diagram showing a flow of a material in the supply member.

As described above, the duct section 423 has a shape that is widened downward in a side view from the +X direction. Therefore, the flow F4 is gradually decreased in speed as the flow F4 travels downward to become a flow F5. The flow F5 travels to the inside of the dispersion section 101 of the forming section 100 that communicates with the duct section 423. In FIG. 4 and FIG. 5 referenced below, the speed levels of the respective flows are reflected in the lengths of the respective arrows, such as the flows F3, F4, and F5. That is, the arrow is longer as the speed is higher.

Here, a cross-sectional width of the duct section 423 is narrower than a cross-sectional width of a region of the collision section 422 coupled to the duct section 423. Specifically, the width in the direction along the X axis in the cross section along an XY plane in the duct section 423 is narrower than the width in the direction along the X axis in the cross section along the XY plane in the lowermost part of the space formed by the collision section 422 and the reducer section 421. Accordingly, the mixture from the collision section 422 to the duct section 423 is increased in speed. Therefore, the flow F3 can be increased in speed to become the flows F4 and F5, and the mixture going toward the dispersion section 101 can be rectified.

The cross-sectional width of the duct section 423 is 15 mm to 45 mm, and it is preferable that the cross-sectional width of the region of the collision section 422 coupled to the duct section 423 is 15 mm to 45 mm. Accordingly, the mixture can be further rectified and fed to the dispersion section 101.

Here, as shown in FIG. 5, the collision section 422 is disposed in the vicinity of an upper apex of the supply member 42 in a side view from the +X direction. Here, in the following description of FIG. 5, unless otherwise specified, a state of a side view from the +X direction will be described.

The cross-sectional area of the reducer section 421 along the YZ plane is larger than a cross-sectional area of the pipe 40 along the YZ plane. As a result, the cross-sectional area of the reducer section 421 is widened, so that the speed of movement of the mixture is decreased. Since the mixture collides with the collision section 422 in a state in which the speed is decreased, bias in a movement direction of the mixture is further less likely to occur, and the dispersibility of the mixture is improved. As a result, a variation in a thickness of the web W can be further reduced.

In particular, it is preferable that the cross-sectional area of the reducer section 421 is 1 time or more and 5 times or less as large as the cross-sectional area of the pipe 40. That is, it is preferable that the cross-sectional area of the reducer section 421 in the region coupled to the pipe 40 is equal to the cross-sectional area of the end portion of the pipe 40 in the –X direction. The cross-sectional area of the reducer section 421 is gradually increased toward the –X direction from the region coupled to the pipe 40, and reaches the maximum in the region coupled to the collision section 422. It is preferable that the cross-sectional area of the reducer section 421 in the region is 5 times or less as large as the cross-sectional area of the pipe 40.

As a result, in the flows F3, F4, and F5, the variation in the speed between the flow along both oblique-side sides of the supply member 42 and the flow toward a central portion of the supply member 42 in the –Z direction is reduced. Specifically, since the cross-sectional area of the reducer section 421 is 1 time or more as large as the cross-sectional area of the pipe 40, it is possible to suppress an excessive increase in the speed of the flow along both oblique-side sides of the supply member 42.

Since the cross-sectional area of the reducer section 421 is 5 times or less as large as the cross-sectional area of the pipe 40, it is possible to suppress an excessive decrease in the speed of the flow along both oblique-side sides of the supply member 42. As a result, a variation in the thickness of the web W in the direction along the Y axis can be further reduced.

The cross-sectional area of the reducer section 421 in the region coupled to the collision section 422 is substantially equal to the area of the collision section 422.

Here, when the speed of the flow F1 from the pipe 40 is excessively high, the flows F3, F4, and F5 along both oblique-side sides of the supply member 42 are larger than the flows F3, F4, and F5 toward the central portion of the supply member 42 in the –Z direction. Therefore, the thickness of the formed web W tends to be increased on both end portion sides in the direction along the Y axis.

In addition, when the speed of the flow F1 from the pipe 40 is excessively low, the flows F3, F4, and F5 along both oblique-side sides of the supply member 42 are less than the flows F3, F4, and F5 toward the central portion of the supply member 42 in the −Z direction. Therefore, the thickness of the formed web W tends to be increased in the vicinity of the center in the direction along the Y axis.

As described above, it is preferable that the planar shape of the collision section 422 is a substantially fan shape, and a virtual central angle θ of the planar shape is 20° to 45°. Accordingly, the resistances of the flows F3, F4, and F5 from the collision section 422 to the duct section 423 are reduced. Therefore, the pressure losses of the flows F3, F4, and F5 can be reduced, the mixture can be smoothly moved, and the dispersibility of the mixture can be improved.

In the forming section 100, the web W having a width wider than a diameter of the pipe 40 is formed. With the configuration described above, the supply member 42 widens the width in the direction along the Y axis and disperses the mixture introduced from the pipe 40 while suppressing variation, and feeds out the mixture to the forming section 100.

Returning to FIG. 4, the inside of the supply member 42 communicates with an inside of the drum section 101b. The drum section 101b is a member having a substantially columnar shape, and a height direction of the substantially columnar shape is along the Y axis. A lower part of the drum section 101b is formed of a metal mesh. The mesh of the metal mesh allows the fibers, the binder, or the like contained in the mixture to pass through.

The rotating member 101a is a + shaped member in a side view from a −Y direction. The rotating member 101a includes a plurality of blade portions having a plurality of opening portions, which will be described below. Although not shown, the rotating member 101a rotates around a rotation axis O as the rotation center along the Y axis by driving a motor or the like while being supported by a support portion.

The accumulation section 102 is a member having a substantially box shape. The accumulation section 102 is disposed downstream of the collision section 422. In the accumulation section 102, the supply member 42 is disposed above an upper surface, and the dispersion section 101 is disposed on an inner side of the upper surface. A region corresponding to a bottom surface of the accumulation section 102 is opened downward. The dispersion section 101 is inside the accumulation section 102 and faces an upper surface of the mesh belt 122 of the web transport section 70. The accumulation section 102 is formed of a resin or a metal, for example.

The mixture (not shown) is introduced into the inside of the supply member 42 from the pipe 40 by the flow F1 along the −X direction, and reaches the inside of the dispersion section 101 through the supply member 42. The mixture is unraveled by passing through the opening portion, which will be described below, in the rotating member 101a that rotates or between the rotating member 101a and the drum section 101b. A plurality of fibers in the mixture are released from an entangled state, separated into a single body, and pass through the mesh of the drum section 101b. As a result, the dispersion section 101 disperses the fibers, the binder, and the like contained in the mixture into the air inside the accumulation section 102.

The mixture is discharged from the inside of the dispersion section 101 into the air inside the accumulation section 102, and is guided above the mesh belt 122 by gravity and a suction force of a suction mechanism 110. Therefore, the mixture is accumulated on the upper surface of the mesh belt 122 through a first base material N1, which will be described below. That is, the accumulation section 102 accumulates the mixture containing the dispersed fibers to form the web W.

Figure 6:
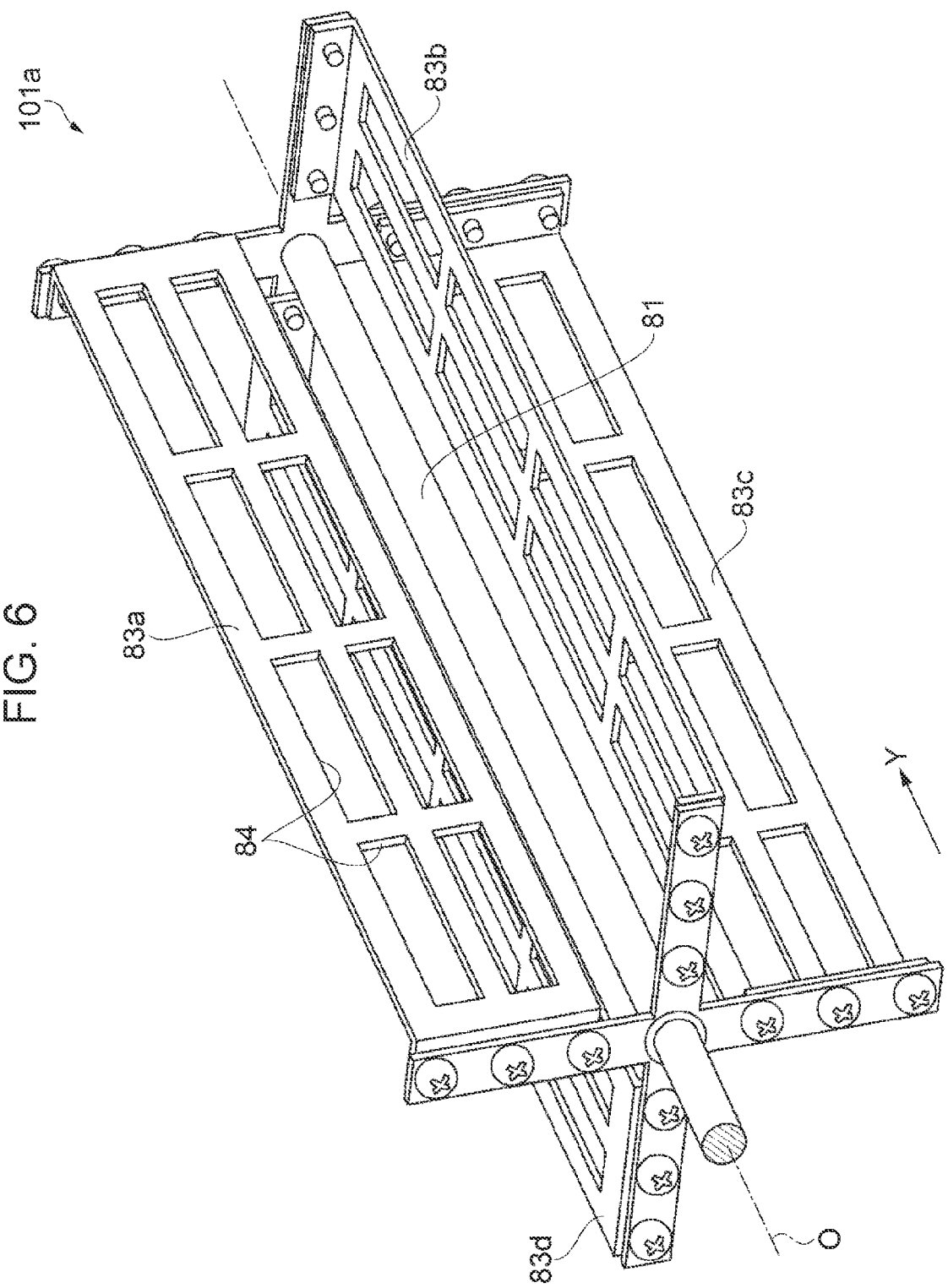
FIG. 6 is a perspective view showing a configuration of a rotating member.

As shown in FIG. 6, the rotating member 101a includes a rotating shaft portion 81 and four blade portions 83a, 83b, 83c, and 83d. The rotating shaft portion 81 is a member having a cylinder shape, and a height direction of the cylinder is disposed along the Y axis. A central axis of the rotating shaft portion 81 coincides with the rotation axis O of the rotating member 101a. The blade portions 83a, 83b, 83c, and 83d are attached to the rotating shaft portion 81 radially from the rotating shaft portion 81 in a side view from the −Y direction.

In the following description, the blade portions 83a, 83b, 83c, and 83d may be collectively and simply referred to as the blade portion 83. The rotating member 101a of the present embodiment includes the four blade portions 83a, 83b, 83c, and 83d, but the number of the blade portions 83 is not limited to this.

The blade portion 83 is a plate-shaped member having a substantially oblong shape, and each long side is disposed along the rotating shaft portion 81. The blade portion 83 has an end portion in a +Y direction and an end portion in the −Y direction which are attached to the rotating shaft portion 81 through a + shaped member (not shown). There is a gap between each long side of each blade portion 83 on the rotating shaft portion 81 side and the rotating shaft portion 81. The blade portion 83 is formed of a resin or a metal, for example.

Here, the blade portions 83a, 83b, 83c, and 83d have the configurations that are rotationally symmetric with respect to the rotation axis O. Therefore, the following description will be made only to the blade portion 83a, and the descriptions of the other blade portions 83b, 83c, and 83d will be omitted.

The blade portion 83a includes the plurality of opening portions 84. Specifically, the plurality of opening portions 84 are provided in a matrix of four rows in the direction along the Y axis and two rows in a radiation direction from the rotation axis O. Each opening portion 84 has a substantially oblong shape with a long side along the Y axis.

Returning to FIG. 1, the web transport section 70 includes the mesh belt 122 and the suction mechanism 110. The mesh belt 122 is an endless belt and is stretched by four stretch rollers 121.

The mesh belt 122 has a strength capable of holding the web W and the like without interfering with the suction by the suction mechanism 110. The mesh belt 122 is formed of a resin or a metal, for example. A hole diameter of the mesh included in the mesh belt 122 is not particularly limited, but is desirably 60 μm or more and 125 μm or less.

At least one of the four stretch rollers 121 is rotationally driven by a motor (not shown). The upper surface of the mesh belt 122 is moved downstream due to the rotation of the stretch roller 121. Stated another way, the mesh belt 122 moves rotationally clockwise in FIG. 1. By the mesh belt 122 moving rotationally, the first base material N1 and the web W, which will be described below, are transported downstream.

A base material supply section 71 is disposed in the −X direction of the web transport section 70. The base material supply section 71 rotatably supports the first base material N1 having a roll shape. The first base material N1 is continuously supplied from the base material supply section 71 to the upper surface of the mesh belt 122.

The first base material N1 interposes the web W with a second base material N2, which will be described below. For example, for the first base material N1 and the second base material N2, a woven fabric or a non-woven fabric is applied. It is preferable that the first base material N1 has a configuration that does not interfere with the suction of the suction mechanism 110. For example, for the first base material N1 and the second base material N2, a polyester long fiber nonwoven fabric manufactured by a spunbond method is applied.

The sheet S is formed by laminating the first base material N1, the web W, and the second base material N2, so that the mechanical strength is improved. In the sheet S, the first base material N1 and the second base material N2 are not essential configurations, and any one or both thereof may be omitted.

When the base material supply section 71 supplies the first base material N1 to the mesh belt 122, the first base material N1 is transported on the mesh belt 122 in the +X direction. In the first base material N1 while being transported, the mixture is fallen from the accumulation section 102 and accumulated on the upper surface. As a result, the web W is continuously formed on the upper surface of the first base material N1. The mesh belt 122 transports the web W downstream together with the first base material N1.

The suction mechanism 110 is disposed below the dispersion section 101. The suction mechanism 110 promotes the accumulation of the mixture on the mesh belt 122. The suction mechanism 110 sucks the air into the accumulation section 102 through a plurality of holes included in the mesh belt 122 and the first base material N1. The plurality of holes in the mesh belt 122 and the first base material N1 allow the air to pass through, and make it difficult for the fibers, the binder, or the like contained in the mixture to pass through. The mixture discharged from the dispersion section 101 to an inner side of the accumulation section 102 is sucked downward together with the air. A known suction device, such as a blower, is adopted for the suction mechanism 110.

As a result, the mixture in the accumulation section 102 is accumulated on the upper surface of the first base material N1 by the suction force of the suction mechanism 110 in addition to the gravity, to form the web W. The web W contains a relatively large amount of the air and is soft and swollen. By the mesh belt 122, the web W is transported downstream together with the first base material N1.

A sensor section 285 is provided at a position facing the web W above the mesh belt 122 in the +X direction of the accumulation section 102. The sensor section 285 is provided in the control section 28.

The sensor section 285 detects an accumulation state of the mixture containing the fibers in the accumulation section 102. Specifically, the sensor section 285 measures the thickness of the web W in a noncontact manner. Although not shown, a plurality of sensor sections 285 are arranged along the Y axis. The sensor section 285 measures the thickness of the web W at a plurality of locations in the width direction of the web W, that is, in the direction along the Y axis. The thickness of the web W is measured at the plurality of locations by the sensor section 285 while being transported downstream.

Here, the mixture that forms the web W is dispersed in the dispersion section 101 which is relatively long in the direction along the Y axis. Therefore, in the web W formed in the related art, the variation in the thickness is likely to occur in the direction along the Y axis.

On the other hand, the sheet manufacturing apparatus 1 includes the supply member 42. Therefore, the variation in the thickness of the web W in the direction along the Y axis can be reduced. Additionally, in the sheet manufacturing apparatus 1, the thickness of the web W measured by the plurality of sensor sections 285 is operated by the control section 28. The volumetric flow rate of the airflow generated by the air blowing section 41 is adjusted from the operation result or the like. As a result, the variation in the thickness is further reduced. Details of the adjustment of the volumetric flow rate will be described below.

For the sensor section 285a, a known sensor can be applied. The sensor section 285 is an optical distance sensor, for example.

A humidifier may be disposed downstream of the sensor section 285 to spray water onto the web W on the mesh belt 122 to humidify the web W. As a result, scattering of the fibers, the binder, or the like contained in the web W can be suppressed. In addition, the water used for the humidification may be impregnated with a water-soluble additive or the like, and the web W may be impregnated with the additive in parallel with the humidification.

A dancer roller 141 is disposed downstream of the web transport section 70. The web W is peeled from the most downstream stretch roller 121, and then pulled into the dancer roller 141. The dancer roller 141 secures a processing time on the downstream part. Specifically, molding in the molding section 150 is a batch process. Therefore, the dancer roller 141 is moved up and down with respect to the web W continuously transported from the accumulation section 102, and a time for reaching the molding section 150 is delayed.

The base material supply section 72 is disposed downstream of the dancer roller 141 and upstream of the molding section 150. The base material supply section 72 rotatably supports the second base material N2 having a roll shape. The second base material N2 is continuously supplied from the base material supply section 72 to the upper surface of the web W. As a result, the web W is fed out to the molding section 150 in a state of being interposed between the lower first base material N1 and the upper second base material N2.

The molding section 150 is a heat pressing device, and includes an upper substrate 152 and a lower substrate 151. The molding section 150 molds the first base material N1, the web W, and the second base material N2 into the sheet S having a continuous paper shape. The upper substrate 152 and the lower substrate 151 are pressurized with the web W interposed therebetween, and are heated by a built-in heater.

The web W is compressed from above and below by the pressurization to be increased in the density, and the binder is melted by the heating and spreads wet between the fibers. When the heating ends in this state and the binder is solidified, the fibers are bound to each other by the binder. As a result, the sheet S having a continuous paper shape, which is composed of three layers of the first base material N1, the web W, and the second base material N2, is molded. The sheet S having a continuous paper shape proceeds to the downstream cutting section 160.

In the molding section 150, instead of the heat pressing device, a heating roller and a pressurization roller may be used for continuous molding. In this case, the dancer roller 141 may be omitted.

The cutting section 160 cuts the sheet S from a continuous paper shape to a single paper shape. Although not shown, the cutting section 160 includes a vertical blade and a horizontal blade. The vertical blade and the horizontal blade are rotary cutters, for example. In addition, an ultrasound cutter or the like may be used instead of the rotary cutter.

The vertical blade cuts the sheet S having a continuous paper shape in a direction along the traveling direction. The horizontal blade cuts the sheet S having a continuous paper shape in a direction intersecting the traveling direction. The sheet S is processed into a substantially rectangular single paper shape and accommodated in a tray 170. In this way, the sheet S is manufactured.

Examples of the use of the sheet S include a cushioning material, a heat insulating material, a sound absorbing material, and a liquid absorbing material. The sheet S is not limited to a relatively thin sheet shape, and may be a plate shape, a relatively thick block shape, and the like. Unevenness or the like may be formed on the sheet S by secondary processing.

Figure 7:
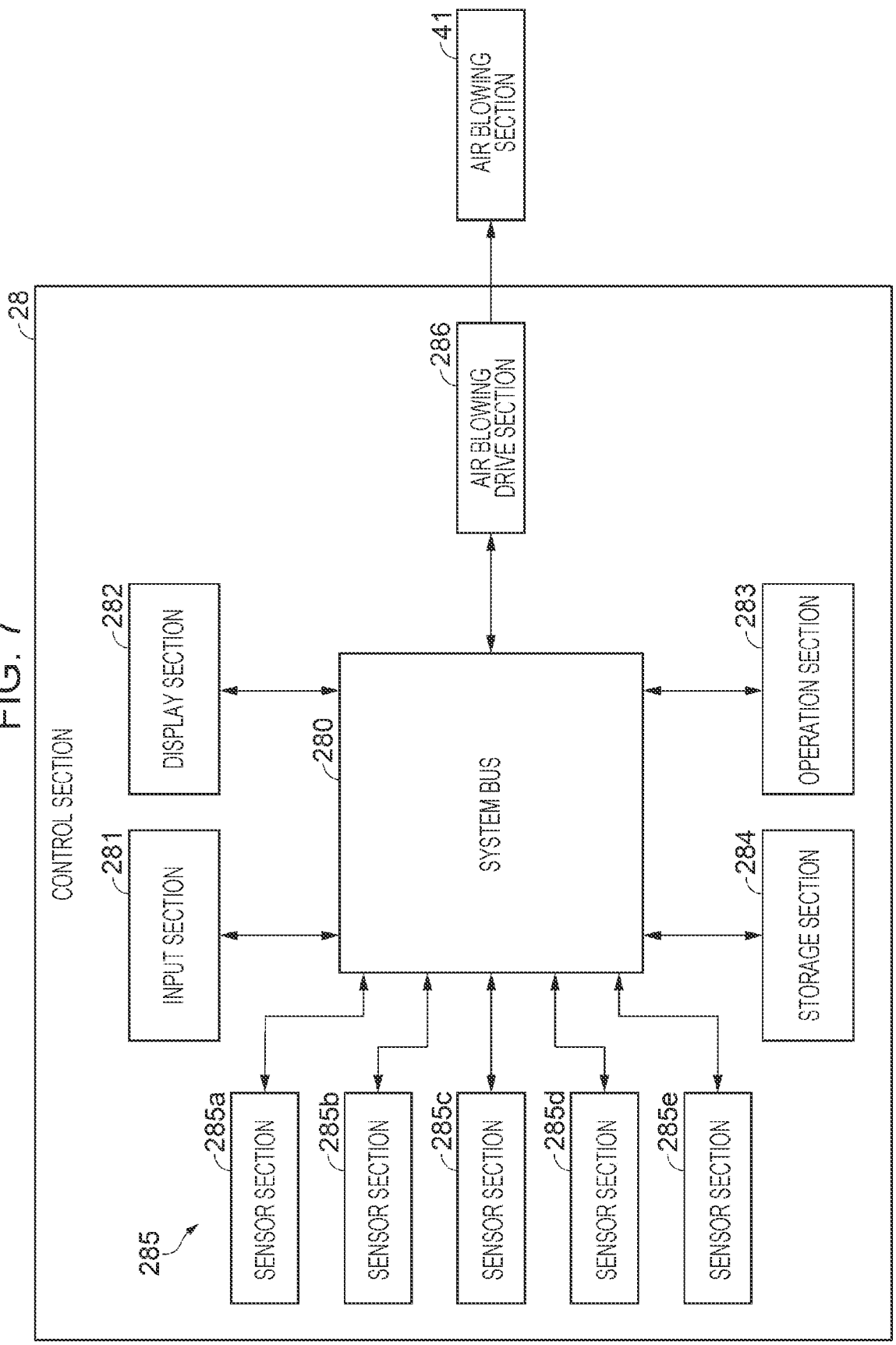
FIG. 7 is a block diagram showing a configuration of a control section.

As shown in FIG. 7, the control section 28 includes a system bus 280, an input section 281, a display section 282, an operation section 283, a storage section 284, the sensor section 285, and an air blowing drive section 286. These configurations are electrically coupled to each other through the system bus 280. The control section 28 is provided on, for example, a main substrate of the sheet manufacturing apparatus 1.

The sensor section 285 includes a plurality of sensor sections 285a, 285b, 285c, 285d, and 285e. The sensor section 285 detects the accumulation state of the fibers of the web W in the accumulation section 102. Specifically, the five sensor sections 285a, 285b, 285c, 285d, and 285e are arranged in this order from the −Y direction to the +Y direction along the Y axis. Each of the five sensor sections 285a, 285b, 285c, 285d, and 285e measures the thickness of the corresponding region of the web W. By comparing the thicknesses measured by the sensor sections 285a, 285b, 285c, 285d, and 285e, the variation in the thickness of the web W in the width direction is clear.

The measurement of the thickness of the web W by the sensor section 285 may be performed with respect to the formed web W continuously, intermittently, or at any timing. The number of the sensor sections 285 is not limited to five.

The air blowing drive section 286 is electrically coupled to the air blowing section 41. The air blowing drive section 286 drives the air blowing section 41. The volumetric flow rate of the airflow generated in the pipe 40 by the air blowing section 41 is changed through the air blowing drive section 286. When a large variation in the thickness of the web W in the width direction occurs, the speed of the airflow generated by the air blowing section 41, that is, the volumetric flow rate can be adjusted to reduce the variation.

The input section 281 receives a user setting including the volumetric flow rate which is a state of the air blowing section 41. An operator of the sheet manufacturing apparatus 1 can optionally change the volumetric flow rate of the air blowing section 41 through the input section 281. It is preferable that the volumetric flow rate of the airflow generated by the air blowing section 41 is less than a suction flow rate of the suction mechanism 110. The volumetric flow rate is not particularly limited, and is changed, for example, in a range of 18 $m^3$/min to 23 $m^3$/min.

The storage section 284 includes a read only memory (ROM) and a random access memory (RAM) (not shown). Various control programs and the like executed by the operation section 283 are stored in the ROM. Data is temporarily stored in the RAM. The storage section 284 stores data including the user setting related to the volumetric flow rate and the like, the accumulation state of the web W measured by the five sensor sections 285, and the state of the air blowing section 41.

The operation section 283 is a central processing unit (CPU), and controls the entire sheet manufacturing apparatus 1. In particular, the operation section 283 operates the data stored in the storage section 284 to give an instruction to change the volumetric flow rate of the air blowing section 41.

The display section 282 displays the data and notifies the operator of the data. The display section 282 is a liquid crystal display device, and may be a touch panel type display device integrated with the input section 281.

Figure 8:
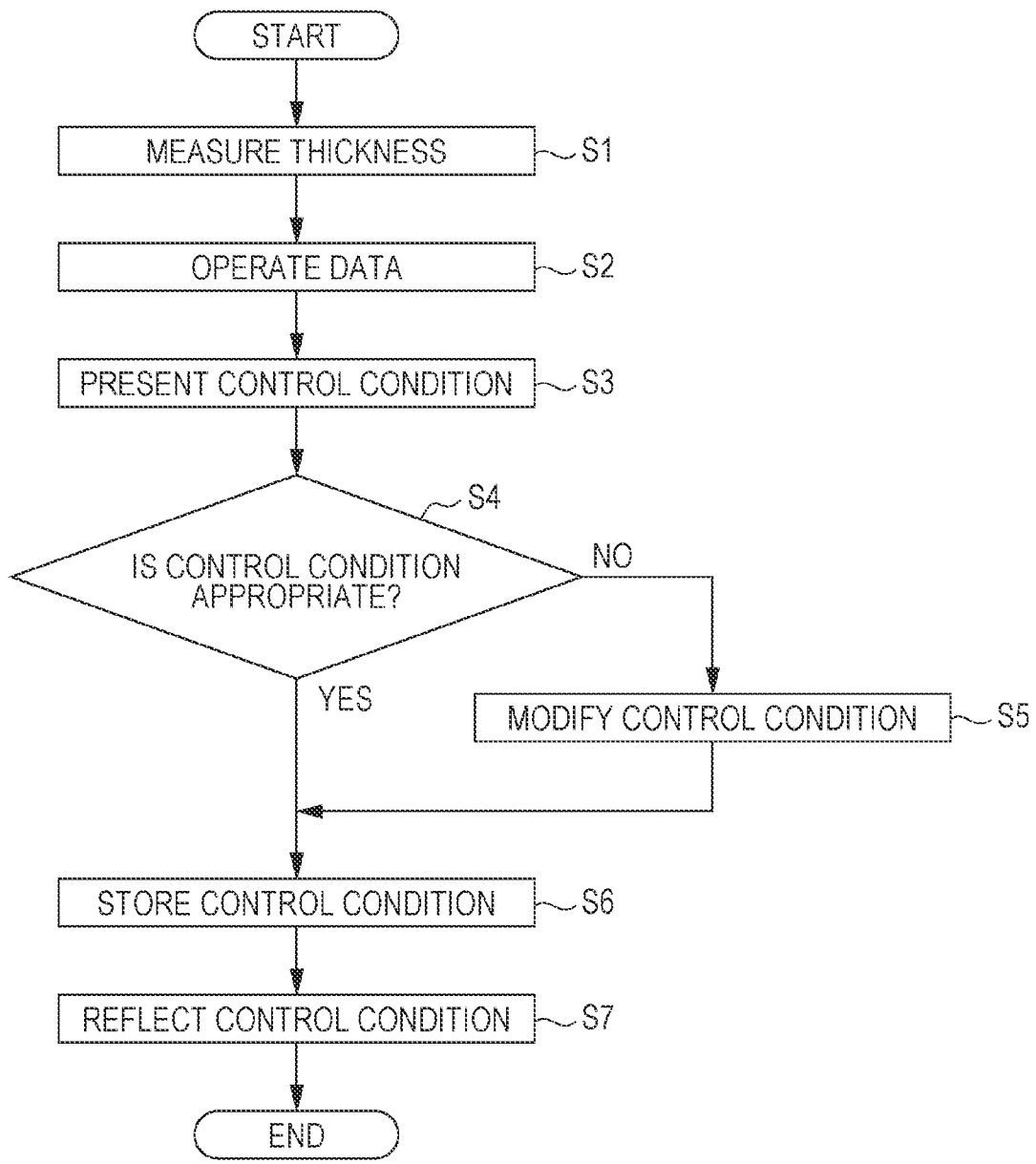
FIG. 8 is a flowchart showing a method of controlling an air blowing section by the control section.

There are roughly two methods of controlling the air blowing section 41 by the control section 28. In the first method, as shown in FIG. 8, the operator determines whether or not a control condition of the air blowing section 41, that is, a set value of the volumetric flow rate is appropriate. The first method includes steps S1 to S7.

In step S1, the thickness of the web W in each region is measured by the five sensor sections 285. The measurement result is transmitted from each sensor section 285 to the operation section 283.

In step S2, the operation section 283 operates the data including the measurement result and the state of the air blowing section 41 in this case. As a result, the volumetric flow rate of the air blowing section 41 for reducing the variation in the thickness of the web W is analyzed and calculated. The derived and recommended control condition of the air blowing section 41 is transmitted from the operation section 283 to the display section 282.

Only in the first case, the data operation in the operation section 283 is performed with reference to a data table stored in the ROM before the sheet manufacturing apparatus 1 is shipped. The second and subsequent data operations are performed with reference to both the data table and the data stored in the RAM after the first time.

In step S3, the display section 282 presents the volumetric flow rate of the air blowing section 41, which is the recommended control condition, to the operator.

In step S4, the operator determines whether or not the recommended control condition is appropriate. When the operator determines that the recommended control condition is appropriate and adopts the control condition, the process proceeds to step S6. When the operator determines that the recommended control condition is not appropriate and modifies the condition, the process proceeds to step S5.

In step S5, the operator inputs the modified control condition from the input section 281. The modified control condition is transmitted from the input section 281 to the storage section 284.

The modified condition in step S5 may be automatically input by a sub-control section. Specifically, the sub-control section is provided in an information terminal, such as a personal computer or a smartphone. The information terminal is coupled to the control section 28 to be able to transmit and receive the information. The sub-control section of the information terminal includes a sub-operation section and a sub-storage section. The sub-storage section learns and stores the control condition, which has been modified and input by the operator in the past, and the display content displayed by the display section 282 of the control section 28. As a result, in step S5, the sub-control section may determine the modified control condition from the past control condition and the display content, and automatically input the modified control condition to the control section 28 on behalf of the operator.

In step S6, the control condition determined by the operator to be appropriate or the modified control condition is stored in the RAM of the storage section 284.

In step S7, the control condition is reflected, and the air blowing drive section 286 drives the air blowing section 41 to change the volumetric flow rate.

Figures 9, 10:
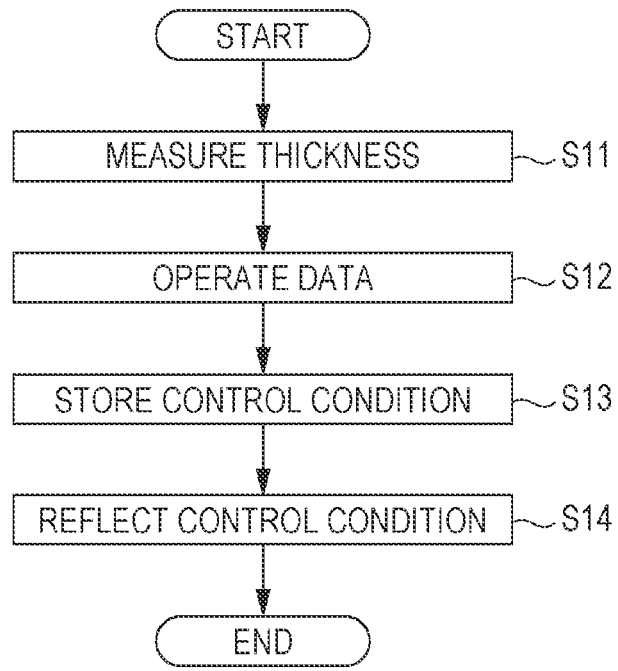
FIG. 9 is a flowchart showing the method of controlling the air blowing section by the control section.
FIG. 10 is a table showing an evaluation result according to an example.

The second method of the methods of controlling the air blowing section 41 by the control section 28 is an automatic mode in which the operator does not determine whether or not the control condition of the volumetric flow rate of the air blowing section 41 is appropriate, as shown in FIG. 9. The second method includes steps S11 to S14. In step S11, the thickness of the web W in each region is measured by the five sensor sections 285. The measurement result is transmitted from each sensor section 285 to the operation section 283.

In step S12, the operation section 283 operates the data including the measurement result and the state of the air blowing section 41 in this case. As a result, the control condition for reducing the variation in the thickness of the web W is analyzed and calculated.

In this case, only in the first case, the data operation in the operation section 283 is performed with reference to the data table stored in the ROM before the sheet manufacturing apparatus 1 is shipped. The second and subsequent data operations are performed with reference to both the data table and the data stored in the RAM after the first time.

In step S13, the derived control condition is stored in the RAM of the storage section 284. In step S14, the derived control condition is reflected, and the volumetric flow rate of the air blowing section 41 is changed.

The first method and the second method, which are described above, can be selected by the operator. In this way, the air blowing section 41 is controlled by the control section 28.

According to the present embodiment, it is possible to obtain the following effects.

The variation in the thickness of the web W can be reduced. Specifically, due to the collision with the collision section 422, the movement speed of the mixture is decreased, the movement directions of the mixture are dispersed, and the bias is less likely to occur. As a result, the mixture containing the fibers is relatively uniformly accumulated in the accumulation section 102. That is, the sheet manufacturing apparatus 1 that reduces the variation in the thickness of the web W can be provided.

The volumetric flow rate of the airflow generated by the air blowing section 41, which is the state of the air blowing section 41, is changed to an appropriate condition according to the user setting or the accumulation state of the fibers contained in the mixture. As a result, the speed at which the mixture collides with the collision section 422 is finely adjusted, so that the bias of the mixture accumulated in the accumulation section 102 can be further suppressed. Since it is possible to input the user setting with reference to the display of the display section 282, the convenience of a user is improved. In addition, since the automatic mode in which the determination or the input of the operator is omitted is provided, the convenience of the operator is further improved.

2. Example

In the following description, the effects of the present disclosure will be described in more detail with reference to examples. The present disclosure is not limited to the examples described below.

First, using the sheet manufacturing apparatus 1, the web W was produced by changing the cross-sectional area of the reducer section 421 with respect to the cross-sectional area of the pipe 40. The thickness of the web W in the direction along the Y axis was measured by the five sensor sections 285, a difference between the largest measured value and the smallest measured value was defined as the variation in the thickness of the web W, and the uniformity of the sheet S was evaluated. The difference was evaluated according to the following evaluation criteria, and the evaluation results were shown in FIG. 10.

Evaluation Criteria
- A: The variation in the thickness of the web W is less than ±20%.
- B: The variation in the thickness of the web W is ±10% or more and less than ±15%.
- C: The variation in the thickness of the web W is ±5% or more and less than ±10%.

As shown in FIG. 10, when the cross-sectional area of the reducer section 421 is 1.0 times and 5.0 times as large as the cross-sectional area of the pipe 40, the uniformity of the sheet S was evaluated as B. In addition, when the magnification was 2.0 times, a C evaluation was obtained.

What is claimed is:

1. A sheet manufacturing apparatus comprising:
    a supply section that supplies a material containing fibers and includes a pipe in which the material flows, the pipe having one end that is a downstream end in a flow direction of the material;
    a collision section which is disposed downstream relative to the pipe in the flow direction and with which the material moving from the pipe collides;
    a reducer section disposed between the pipe and the collision section in the flow direction, the one end of the pipe being coupled to the reducer section in a coupling direction; and
    an accumulation section that is disposed downstream relative to the collision section in the flow direction and accumulates the material to form a web,
    the reducer section having a cross-sectional area as viewed in the coupling direction, the cross-sectional area increasing as the reducer section approaches from a side of the pipe to the collision section in the coupling direction.

2. The sheet manufacturing apparatus according to claim 1,
    wherein
    the cross-sectional area of the reducer section is larger than a cross-sectional area of the pipe as viewed in the coupling direction.

3. The sheet manufacturing apparatus according to claim 1, wherein
    the cross-sectional area of the reducer section is 1 to 5 times or less as large as the cross-sectional area of the pipe as viewed in the coupling direction.

4. The sheet manufacturing apparatus according to claim 1, wherein
    a planar shape of the collision section is a substantially fan shape, and
    a virtual central angle of the planar shape is 20° to 45°.

5. The sheet manufacturing apparatus according to claim 1, further comprising:
    a duct section disposed between the collision section and the accumulation section, wherein
    a cross-sectional width of the duct section is narrower than a cross-sectional width of a region of the collision section coupled to the duct section.

6. The sheet manufacturing apparatus according to claim 5, wherein the cross-sectional width of the duct section is 15 mm to 45 mm, and the cross-sectional width of the region of the collision section coupled to the duct section is 15 mm to 45 mm.

7. The sheet manufacturing apparatus according to claim 1, further comprising:

a control section, wherein the control section includes a sensor section that detects an accumulation state of the fibers in the accumulation section, an air blowing drive section that drives an air blowing section that supplies the material to the supply section, an input section that receives a user setting including a state of the air blowing section, a storage section that stores data including the user setting, the accumulation state, and the state of the air blowing section, an operation section that operates the data stored in the storage section to give an instruction to change the state of the air blowing section, and a display section that displays the data.

\* \* \* \* \*